No. 736,558. PATENTED AUG. 18, 1903.
J. A. & O. J. SMITH.
HAY RAKE, STACKER, AND LOADER.
APPLICATION FILED APR. 15, 1902. RENEWED JUNE 29, 1903.
NO MODEL. 3 SHEETS—SHEET 3.
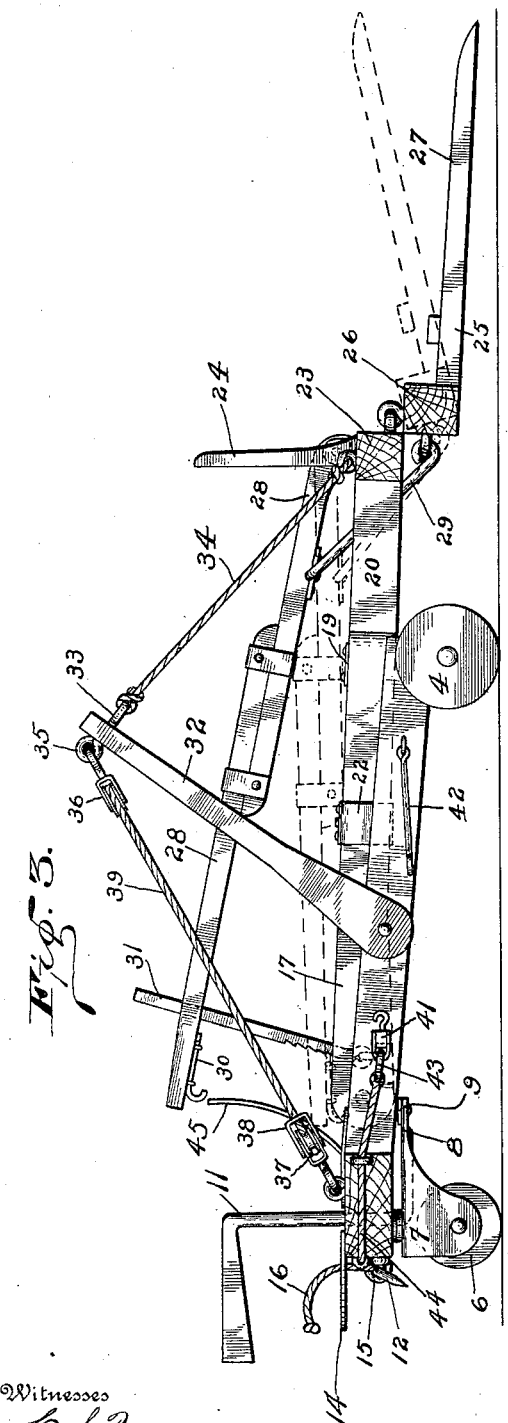
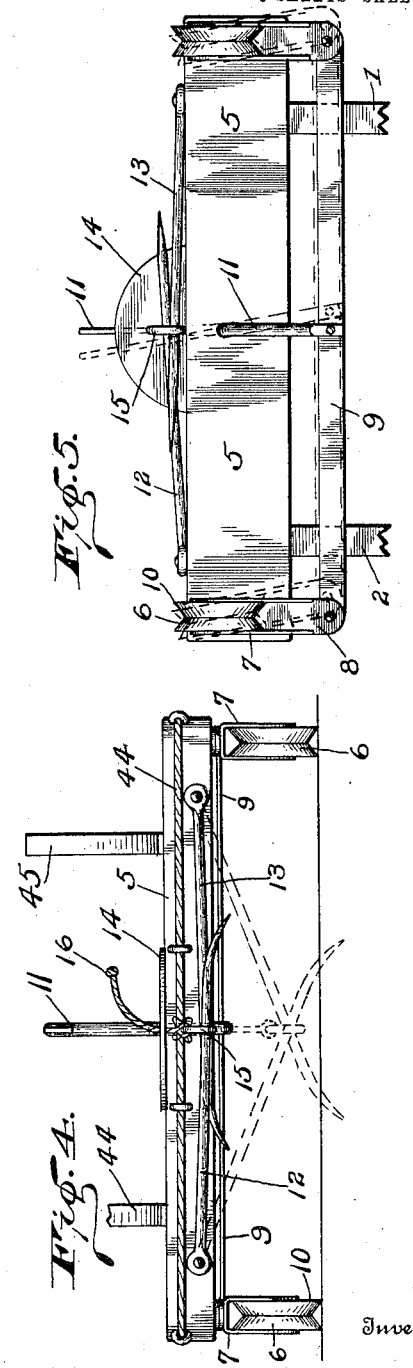
Witnesses
C. S. Frye
C. F. Hatch.
Inventors
James A. Smith
and Orville J. Smith,
W. J. Fitzgerald
Attorneys No. 736,558.

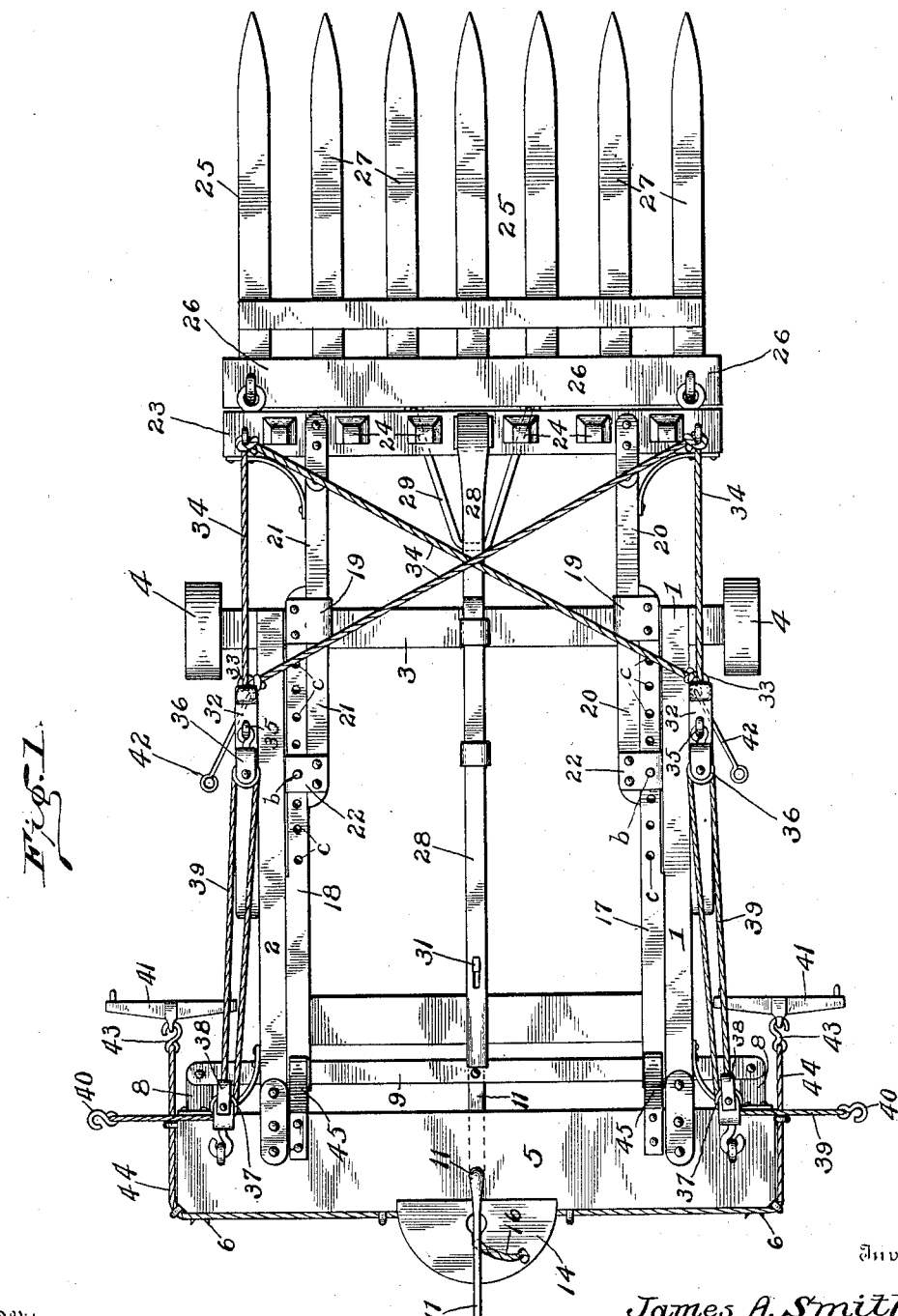

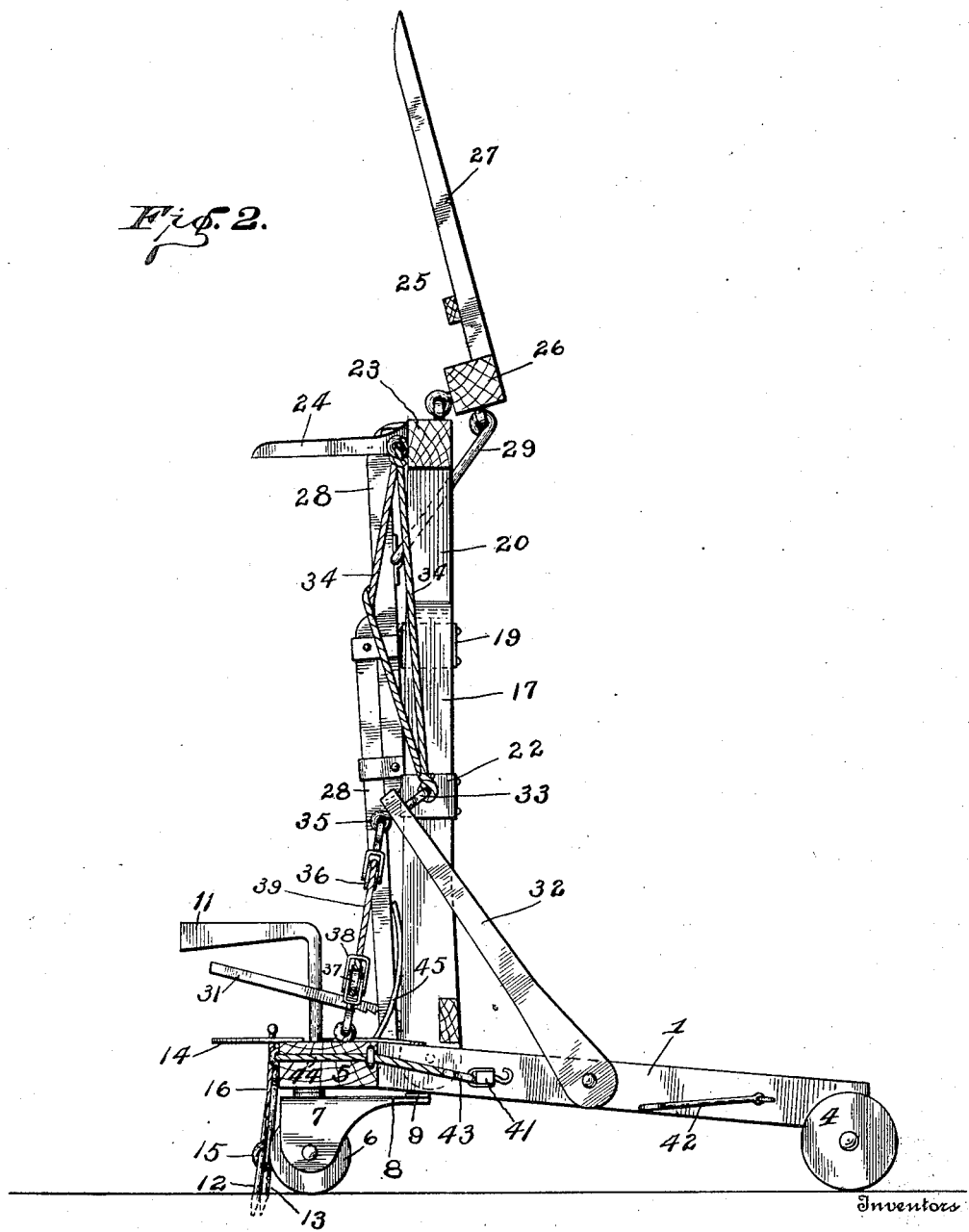

Patented August 18, 1903.

UNITED STATES PATENT OFFICE.

JAMES A. SMITH AND ORVILLE J. SMITH, OF LINCOLNVILLE, KANSAS.

HAY RAKE, STACKER, AND LOADER.

SPECIFICATION forming part of Letters Patent No. 736,558, dated August 18, 1903.

Application filed April 15, 1902. Renewed June 29, 1903. Serial No. 163,659. (No model.)

*To all whom it may concern:*

Be it known that we, JAMES A. SMITH and ORVILLE J. SMITH, citizens of the United States, residing at Lincolnville, in the county of Marion and State of Kansas, have invented certain new and useful Improvements in Hay Rakes, Stackers, and Loaders; and we do hereby declare the following to be a full, clear, and exact description of the invention, such as will enable others skilled in the art to which it appertains to make and use the same.

Our invention relates to certain new and useful improvements in hay rakes and stackers of that type wherein the rake is carried by an adjustable frame mounted to move in the arc of a circle from a substantially horizontal to a substantially vertical position.

Our object is to provide a device whereby hay or other classes of grain may be gathered from the swath or windrow and transported to the stack and elevated thereupon.

With these ends in view the invention consists of certain novel features of construction and arrangement of parts, as will be hereinafter more fully described, and pointed out in the claims.

In the accompanying drawings, Figure 1 is a top plan view of our invention. Fig. 2 is a side elevation thereof, showing the rake in its elevated or vertical position, as when the hay is being placed upon the stack. Fig. 3 is a similar view showing the rake in its horizontal position, as when the hay is being gathered from the windrow or swath. Fig. 4 is an elevation of that portion of our device carrying the guiding and anchoring mechanisms. Fig. 5 is an under side plan of the same.

Referring to the drawings, 1 and 2 indicate the side bars of the carrying-frame, the said bars being attached at one end to an axle 3, mounted upon the wheels 4. At the opposite ends the bars 1 and 2 are secured to a platform 5. Revolubly mounted upon the under side of the platform 5 and at either end thereof are guiding trunnions or wheels 6, carried in suitable brackets 7, one portion being elongated, as at 8, to receive and be pivotally attached to the guide-bar 9.

To prevent the wheels 6 from slipping and to assure positive results, the said wheels are channeled or grooved, so that the outer edges 10 thereof will sink into the earth. Thereby when the wheels are directed to the right or left through the medium of the guide-bar 9 and crank-lever 11 the rake will be quickly and positively guided. The said wheels also assist in keeping the carrying-frame rigid while the rake is being lifted from a horizontal to a vertical position.

Pivotally attached to one edge of the platform 5 are anchor-bars 12 and 13, so arranged that when lowered to the position shown by dotted lines in Fig. 4 and full lines in Fig. 2 the points thereof will take into the earth, thereby anchoring the carriage against any lateral strain while the rake containing the load of hay is being elevated.

When the rake is being used to gather the hay from the windrow or swath, the anchoring-bars 12 and 13 are drawn up out of the way and secured to the plate 14 through the medium of the ring 15 and rope or cable 16, as clearly shown, or other equivalent device. The rope 16 being connected to the free ends of the anchoring members 12 and 13, it is obvious that said free ends may be readily drawn upward or lowered by means of said rope, as may be desired. When said members are drawn upward, the rope may be secured in any preferred way so as to hold said members in an elevated position until it may again be desirable to lower the same.

Pivotally connected to the side bars 1 and 2 are the hoisting-arms 17 and 18, carrying clips 19 at the outer ends thereof, through which passes one end of the telescoping arms 20 and 21. Surrounding the arms 17 and 18 between the pivot-point and the clips 19 and carried by the inner ends of the arms 20 and 21 are clips 22. By this means the hoisting apparatus may be lengthened or shortened to suit the height of the stack while in course of construction. When the arms 20 and 21 have been properly adjusted, they are held firmly in place by means of a pin $b$, which passes through holes in the clips 22 and one of a series of holes $c$ in the arms 20 and 21.

Attached rigidly to the outer ends of the arms 20 and 21 is a cross-head 23, carrying standards 24, the said standards serving to prevent the hay from sliding back upon the framework of the carriage when the hay is being gathered from the windrow and also prevent the hay from falling upon the carriage while on its ascent to the stack.

Pivotally mounted upon the cross-head 23 by means of eyebolts or otherwise is a rake 25, composed of the cross-head 26 and teeth 27. In gathering hay or the like the rake portion 25 is lowered to the position shown in full lines in Fig. 3, but when a sufficient amount of hay has been gathered the rake portion is raised to the position shown in dotted lines in Fig. 3, when the load may be drawn to the desired destination, without gathering any more hay, and ride freely over any obstructions. This result is accomplished through the medium of the longitudinally-adjustable lever 28, one end of which is pivotally mounted upon the cross-head 23 and the link or clevis 29. The lever 28 is held in the position shown by dotted lines in Fig. 3 and full lines in Fig. 2 by means of the sliding detent 30 coming in contact with the teeth on the rack-bar 31.

It will be seen by referring more particularly to Fig. 3 that the major portion of the rack-bar 31 is smooth, so that when the rake is lowered in position to gather the hay the rake and lever will be left free to play up or down, as when the rake comes in contact with some small obstruction, such as rocks, chunks, or the like.

To raise the rake from a horizontal to a vertical position without undue strain, we have provided pivoted posts 32, disposed intermediate the rake 25 and platform 5, to the upper or free end of which we have attached eyebolts 33, into which take one end of a flexible cable 34, the opposite ends of said cable being attached to the opposite ends of the cross-head 23. On the opposite side of the post 32 we have provided eyebolts 35, to which is attached sheaves 36.

Attached to the upper side of the platform 5 are sheaves 37, provided with clevises 38, to which is attached one end of the hoisting ropes or cables 39. The said cables pass up each around a sheave 36, thence down along itself around the sheave 37, the free end thereof terminating in a hook 40 or the like.

In operation draft-animals are attached to the swingletrees 41, when the rake may be moved forward until the desired amount of hay has been gathered. The lever 28 is then depressed and the rake 25 tilted up, as shown by dotted lines in Fig. 3, when the load may be transported to the desired destination. The carriage is then placed in proper relation to the stack by means of the hand-pulls 42 or otherwise. The anchor-bars 12 and 13 are lowered to the position shown by dotted lines in Fig. 4, when the rake portion is ready to be elevated. The swingletrees 41 are then disengaged from the hooks 43 of the draft-cable 44 and engaged with the hooks 40 upon the ends of the hoisting-ropes 39, when the rake is drawn to a substantially vertical position, the draft-animals traveling in opposite directions from each other and at right angles to the frame of the rake. By having the respective hooks 40 and 43 it will be seen that a multiplicity of swingletrees will be obviated and also the arduous task of unhitching and hitching the draft-animals, thereby saving much time, as it takes but a moment to unhook the swingletree from one hook and attach it to the other. The hand-pulls 42 may be provided with a snap-hook to engage the collar of the animal.

To prevent the rake 25 from passing beyond a vertical position toward the stack we have secured springs 45 to the upper face of the platform 5, the curved ends of which come in contact with and press against the hoisting-arms 17 and 18. These springs also start the rake on its downward course after the load has been discharged and the tension on the cables 39 has been released.

Having thus fully described our invention, what we claim as new, and desire to secure by Letters Patent, is—

1. In a combined hay rake and stacker, a suitable frame; carrying-trucks for said frame; means to guide said trucks in either direction; telescoping rake-beams pivoted to said frame; a rake proper pivotally connected to the free ends of said beams and means substantially as described to elevate and depress the rake, all combined substantially as specified and for the purpose set forth.

2. In a combined rake and stacker, a suitable supporting-frame; telescoping supporting-beams pivoted to said frame and an adjustable lever operatively connected to said beams; a rack-bar coöperating with said lever and a rake movably secured to the free ends of said beams in combination with pivoted standards 32 carried by said frame and means coöperating with said standards to elevate and depress the rake as desired, as set forth.

3. In a hay rake and stacker, the combination with a frame of transverse anchoring-bars 12 and 13 pivoted by their outer ends to said frame and having their sharpened inner ends overlapping each other and means to hold and manually release said sharpened ends whereby they will drop downward into engagement with the ground and thereby hold the frame against lateral strain as set forth.

In testimony whereof we affix our signatures in presence of two witnesses.

JAMES A. SMITH.
ORVILLE J. SMITH.

Witnesses:
J. M. McHenry,
J. W. Buckly.